US006895922B1

(12) United States Patent
Stoughton

(10) Patent No.: US 6,895,922 B1
(45) Date of Patent: May 24, 2005

(54) ROTARY OPPOSED PISTON ENGINE

(75) Inventor: Donald Roy Stoughton, deceased, late of Salt Lake City, UT (US); by Gloria Snowden, legal representative, Salt Lake City, UT (US)

(73) Assignees: Gloria Snowden-Wood, Salt Lake City, UT (US); Donald B. Stoughton, Wayland, MI (US); Sharon Friel, Martin, MI (US)

( * ) Notice: Subject to any disclaimer, the term of this patent is extended or adjusted under 35 U.S.C. 154(b) by 0 days.

(21) Appl. No.: 10/914,686

(22) Filed: Aug. 9, 2004

(51) Int. Cl.[7] .............. F04C 2/77; F04C 1/00; F04C 17/00
(52) U.S. Cl. .............. 123/241; 418/36; 418/143
(58) Field of Search .............. 123/241, 245; 418/35, 36, 37, 38, 141, 143

(56) References Cited

U.S. PATENT DOCUMENTS

| 1,299,588 | A | 4/1919 | Luikart | 123/245 |
|---|---|---|---|---|
| 1,795,750 | A | 3/1931 | Wolstenholme | 418/38 |
| 1,950,228 | A | 3/1934 | Dedieu | 418/38 |
| 2,075,654 | A | 3/1937 | Martin | 123/245 |
| 2,142,706 | A | 1/1939 | Wolstenholme | 418/33 |
| 2,349,848 | A | 5/1944 | Davids | 418/36 |
| 2,352,877 | A | 7/1944 | Wolstenholme | 418/33 |
| 2,840,058 | A | 6/1958 | Stringer | 418/33 |
| 3,034,486 | A | 5/1962 | Buxton | 418/36 |
| 3,244,156 | A | 4/1966 | Curtiss | 418/36 |
| 3,301,193 | A | 1/1967 | Moore | 418/36 |
| 3,302,625 | A | 2/1967 | Cunningham | 418/36 |
| 3,385,272 | A | 5/1968 | Winogrodski et al. | 418/36 |
| 3,500,798 | A | 3/1970 | Arnal | 418/36 |
| 3,644,069 | A | 2/1972 | Stewart | 418/143 |
| 3,807,368 | A | 4/1974 | Johnson | 418/36 |
| 3,822,971 | A | 7/1974 | Chahrouri | 418/36 |
| 3,890,939 | A | 6/1975 | McIntosh | 418/36 |
| 3,990,405 | A | 11/1976 | Kecik | 418/36 |
| 4,026,249 | A | 5/1977 | Larrea | 123/245 |
| 4,072,447 | A | 2/1978 | Gaspar | 418/36 |
| 4,872,818 | A | * | 10/1989 | Takami | 418/36 |
| 5,740,765 | A | 4/1998 | Ball et al. | 418/36 |
| 5,996,538 | A | 12/1999 | Rocha et al. | 123/18 A |
| 6,071,098 | A | 6/2000 | Richards | 418/36 |
| 6,247,444 | B1 | 6/2001 | Parks | 123/245 |

* cited by examiner

Primary Examiner—Sheldon J Richter
(74) Attorney, Agent, or Firm—Price, Heneveld, Cooper, DeWitt & Litton, LLP

(57) ABSTRACT

A rotary engine includes a housing, a shaft, a plurality of main pistons, a plurality of main piston rods, a plurality of following pistons, a plurality of following piston rods, a following piston timing mechanism and a plurality of timing bars.

21 Claims, 5 Drawing Sheets

ROTARY OPPOSED PISTON ENGINE

BACKGROUND OF THE INVENTION

The present invention is generally directed to an engine and, more specifically, to a rotary opposed piston engine.

Various rotary engines have been proposed that implement a plurality of piston pairs that operate in concert. For example, U.S. Pat. No. 2,075,654 discloses a rotary engine, whose expansion chamber is sealed with a ring arranged in a slot of a hollow casing body, so as to be capable of sliding on a flange. The ring includes slots through which arms extend and the rings may be secured to one of the arms. At least one embodiment discloses three working chambers or spaces, which are connected mechanically with one another by three arms secured on a shaft and three planet wheels, which control movement of a corresponding piston.

U.S. Pat. No. 1,950,228 discloses a rotary internal combustion engine that includes a main body having the form of a hollow torus, which includes a plurality of pistons that are connected to a drive shaft, which is located coaxially with the torus. The engine includes a set of cams adapted to periodically increase the periphery speed of each piston, with reference to an adjacent piston, in order to effect a compression in the chamber in the front and a suction in the chamber to the rear. The working chambers at the interior of the torus are made leakless by elastic packing members, which are mounted upon each piston. As a piston approaches an immediately preceding piston, the fuel mixture contained in the working chamber is compressed, which causes suction in the chamber at the rear of the piston.

U.S. Pat. No. 2,349,848 discloses a mechanism that includes an annular chamber having a shaft coaxial with the chamber and rotatable relative thereto. The shaft is coupled to a plurality of double-faced pistons by a plurality of rigidly attached arms. A gear ring, associated with each of the arms, moves adjacent pistons successively toward and away from one another.

U.S. Pat. No. 2,840,058 discloses an alternating piston-type internal combustion engine that includes two pairs of pistons and three exhaust ports. A fuel-air mixture is fed between the pistons through a port past a valve, when the volume between the pistons is at its maximum. The mixture is then compressed and a spark plug is energized to ignite the mixture. At the point of explosion, the valve is closed due to pressure buildup and the piston is locked in position by engagement of a cam stop with a pin. The resulting expansion forces the trailing piston forward and pulls the shaft around with it to the final exhaust stroke position, where the space between the pistons is open to the atmosphere through an exhaust port. A pair of lips, which slide over one another, seal the annular recess and, thus, seal the cylinder between the pistons.

U.S. Pat. No. 3,822,971 discloses a rotary piston engine that has a toroidal cylinder having in its sidewall three sets of exhaust ports and intake ports and appropriately positioned spark plugs. The ports and the spark plugs are arranged in one-hundred twenty degree intervals around the cylinder. Two pairs of oppositely positioned double-ended pistons located in the cylinder cover or uncover the ports, with the pistons of each pair being interconnected by rotative radial members. Seals are positioned between the pistons.

U.S. Pat. No. 3,034,486 discloses a pulsating rotary engine that includes six evenly spaced pistons and six evenly spaced trailing pistons arranged in alternating relationship in a toroidal cavity defined between housing segments and rotating respectively with ring gears. In one embodiment, three respective pairs of intake and exhaust ports are provided evenly spaced around the periphery of the housing and circumferentially aligned. The sets of pistons alternately move toward and away from one another as they rotate with the ring gears. Finally, U.S. Pat. No. 3,807,368 discloses a rotary piston machine, whose pistons include curved flanges that allow the pistons to seal the cylinder wall opening at the radial inner side of each combustion chamber.

While the above-described rotary engines are generally functional, they tend to be complex and, as such, relatively expensive to produce. What is needed is a rotary opposed piston engine, whose design generally reduces the number of components, thus, allowing the engine to be manufactured relatively economically.

SUMMARY OF THE INVENTION

The present invention is directed to a rotary engine including a housing, a shaft, a plurality of main pistons, a plurality of main piston rods, a plurality of following pistons, a plurality of following piston rods; a following piston timing mechanism and a plurality of timing bars. The housing includes a first portion and a second portion, with the first portion including an upper ring gear and the second portion including a lower ring gear. The first and second portions provide a toroidal passageway having an interior opening, when joined. The shaft is centrally positioned through a center of the upper and lower ring gears. The plurality of main pistons are positioned within the toroidal passageway and each include an elongated main piston seal that extends from an inner face of the main piston. The main pistons are coupled to the shaft by one of the main piston rods. The plurality of following pistons are positioned within the toroidal passageway and each of the following pistons is fixed with respect to the other following pistons and each of the following pistons includes an elongated following piston seal that extends from an inner face of the following piston.

One of the following pistons is positioned between each of the main pistons and works in conjunction with one of the main pistons. Each of the following pistons are movably mounted to the shaft by one of the following piston rods and the main piston seal and the following piston seal, in conjunction with a portion of the first and second portions of the housing, provide a combustion chamber for each associated piston pair. The following piston timing mechanism includes an upper timing mount and a lower timing mount spaced apart and each coupled to the shaft. Each of the upper and lower timing mounts includes a plurality of spaced arms, each of which has an associated timing gear movably coupled adjacent to an end of each of the arms. The gears associated with the upper timing mount are in engagement with the upper ring gear and the gears associated with the lower timing mount are in engagement with the lower ring gear. The plurality of timing bars are fixed between and offset from a center of each of the timing gears coupled to the upper and lower timing mounts. The timing bars engage the following piston rods to initiate compression in the combustion chambers.

According to another embodiment of the present invention, the housing includes a plurality of intake ports, a plurality of exhaust ports and a plurality of ignition ports. According to yet another embodiment of the present invention, the housing includes three intake ports, three exhaust ports and three ignition ports. In this embodiment, the intake ports are positioned at eighty, two-hundred and three-hundred twenty degrees, the exhaust ports are positioned at seventy, one-hundred ninety and three-hundred ten degrees and the ignition ports are positioned at zero, one-hundred twenty and two-hundred forty degrees. In one embodiment of the present invention, a tooth ratio of the upper and lower ring gears and the timing gears is three to one. According to another embodiment of the present invention, the upper and lower ring gears have thirty teeth and the timing gears have ten teeth. According to a different embodiment of the present invention, the first and second portions of the housing each include an integrated shelf for engaging one of the following piston seal and the main piston seal. According to still another embodiment of the present invention, the housing, the main pistons and the following pistons are each made of a ceramic material.

These and other features, advantages and objects of the present invention will be further understood and appreciated by those skilled in the art by reference to the following specification, claims and appended drawings.

DETAILED DESCRIPTION OF PREFERRED EMBODIMENTS

Figure 1:
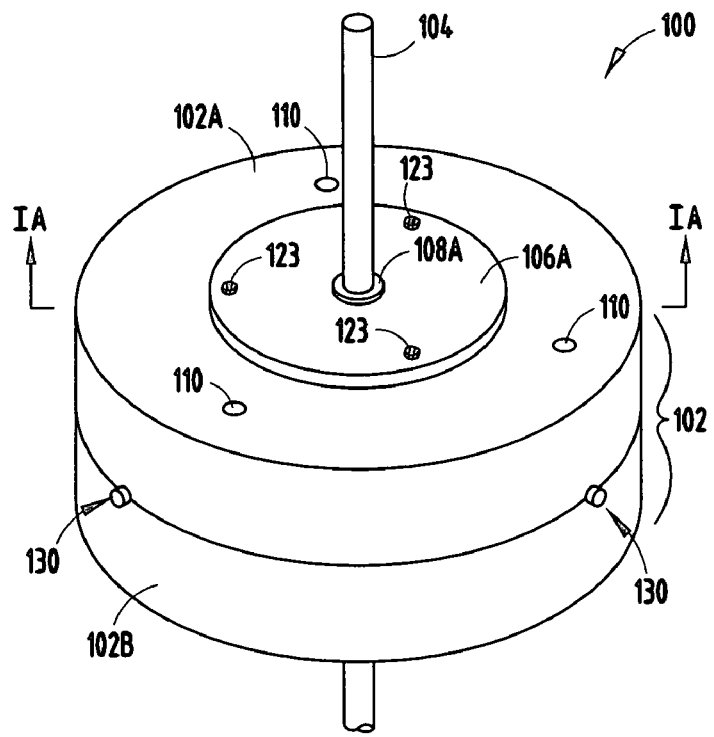
FIG. 1 is a perspective view of an exemplary rotary engine constructed according to one embodiment of the present invention.

As used herein, the terms "upper" and "lower" are for reference only and are not intended to be limiting.

The present invention is generally directed to a direct drive rotary opposed piston engine that has an open air cooled interior. In a typical embodiment, a blower operated by the exhaust of the motor supplies fresh air for combustion and evacuates burnt gases from the cylinder ports, which are opened or closed by the pistons that, in turn, are controlled with a geared timing mechanism that is synchronized to the power shaft of the engine. In one embodiment, there are three main pistons and three following pistons that are configured coaxially within the cylinder by offset piston rods, which are connected to the engine power shaft at different positions. The power pistons are fixed to the engine shaft to provide a direct drive and the following pistons work in conjunction with the main pistons allowing expansion and compression.

In one embodiment, the engine is configured to fire nine times in one revolution. In this embodiment, the nine firings consist of three simultaneous compression ignitions every one-hundred twenty degrees of travel. A rotary opposed engine configured according to the present invention includes a plurality of piston pairs that operate in a circular cylinder. Wheeling action of the pistons results in smooth operation and eliminates the need for a counter balance crank that is required in the operation of a reciprocating engine.

It should also be appreciated that a rotary engine designed according to the present invention eliminates the need for an oil sump, valves, valve springs, cam shafts, molded intake and exhaust manifolds and virtually all of the equipment necessary for a standard cooling system. As is described herein, it is contemplated that the rotary opposed piston engine would be implemented with diesel fuel. However, it should be appreciated that, with minor modifications, a rotary opposed piston engine designed according to the present invention can use an alternative fuel, with the employment of a conventional ignition system.

According to one embodiment, the housing of the rotary engine is implemented with a molded or machined ceramic block, which includes a number of intake and exhaust ports positioned therein. In this embodiment, the engine is air cooled and fuel injection is also provided through the ceramic housing. Of course, conventional metal, such as aluminum, may also be used in forming a rotary engine housing. A blower, which may be operated by the exhaust of the engine, supplies fresh air for combustion and evacuates the burnt gases from the cylinders. Compression ignition eliminates the need for complicated ignition systems, which have been standard in gasoline engine systems. In a typical situation, a rotary opposed piston engine designed according to the present invention is substantially more efficient than standard engines that fire once in two revolutions of the crank.

In the disclosed embodiment, combustion occurs on each of three sets of pistons every one-hundred twenty degrees of travel and each power piston is in a power phase for seventy degrees of travel. The main pistons then uncover the exhaust ports to evacuate burnt gases and uncover the intake ports in another ten degrees of travel providing fresh air. In the disclosed design, the engine has three main pistons individually connected to one main power shaft, with each main piston having a following piston that provides compression and acts as a block to opposite reaction during combustion and power phase. The following pistons cover the intake ports at eighty, two-hundred and three-hundred twenty degrees with the main pistons at one-hundred five, two-hundred twenty-five and three-hundred forty-five degrees, respectively. Compression takes place during this phase until each set of pistons is at top dead center (TDC), after which point fuel is injected again and combustion starts another phase of operation.

It should be appreciated that the engine is initially started in a conventional manner, such as through the use of a flywheel and an attached starter, e.g., a 24 V starter. It is contemplated that the rotary opposed piston engine according to the present invention may be lubricated in a conventional manner. It should be appreciated that a rotary opposed piston engine configured according to the present invention also allows for multiple rotary opposed engines to be mounted on the same shaft in series by rotating additional engines to space out the TDC, such that the power is delivered sequentially to the shaft and to allow a starting system to provide adequate cranking power.

As is discussed in further detail below, the housing is a two-part housing and may be made of ceramic. According to one embodiment, one-half of the ceramic housing is designed to exhaust and the other half of the ceramic housing is designed to provide intake ports. In general, the halves of the ceramic housing should be designed to maintain adequate clearance near their outer circumference to allow bolts to pass through the housing without impinging upon the interior design feature or included mechanical equipment. As is briefly mentioned above, the interior of the housing is open in nature, while allowing for an "OTTO" cycle to occur, while transferring power from the pistons to a single central uniform engine shaft.

As is described herein, the rotary opposed piston engine includes few moving parts, may be air cooled and provides for simplified operation. Portions of the housing are, in general, molded or machined circular cylindrical halves, which are designed such that the bottom of the cylindrical shape allows for tolerance of aligned piston rods to facilitate three-hundred sixty degree movement at the interior of the housing, when both portions, e.g., halves, of the housing are joined.

According to another embodiment of the present invention, a shelf is formed into each half of the interior of the housing. These shelves, as is disclosed above, engage piston fingers of the following pistons and help to provide a sealed chamber. Alternatively, the piston fingers may extend from the main piston and a piston key may extend from the following piston. As is also discussed above, the housing includes fuel injector ports, which may be positioned at zero, one-hundred twenty and two-hundred forty degrees. The fuel injection ports extend from a top of the engine housing through a top of the interior formed circular cylinder and are at a TDC of the three sealed chambers encompassed within the formed circular cylinder. Alternatively, the fuel injection ports may pass through a face of either the upper and/or lower portion of the housing, similar to the exhaust and input ports.

It should be appreciated that the two halves of the engine housing are joined by a head gasket, which may receive and hold fuel injector receiving tubes that are retained when joining bolts, which also pass through the head gasket, are secured. Alternatively, in certain designs, a head gasket may not be required. The two housing portions, when joined, provide a preformed circular bore or toroidal passageway and also each contain an inverted ring gear positioned therein. Each half of the circular housing may also include a circular inspection opening, which is smaller than the cylinder bore diameter, but concentric such that it passes through the housing to the inside bore.

It should be appreciated that the thickness of the housing exterior wall to the inside wall should be such as to maintain integrity to contain the generated forces during compression. The engine shaft passes through the interior of the housing and flanges, which cover the circular inspection opening. The engine shaft centerline is generally congruent to the centerline of the circular inspection opening and the centerline of the flanges. The flanges may be equipped with bearings to permit engine shaft passage and rotation. In general, the flanges slide down the engine shaft and are readily removed for inspection or simple maintenance, thus, simplifying repair without requiring that the entire housing be split. The flange may include a raised circular lip, at an interior surface, to provide a snug fit into the inspection opening and may also include a gasket for sealing the flange to the housing.

With reference to FIG. 1, an exemplary rotary engine 100 is depicted that includes a housing 102 having a first portion 102A and a second portion 102B. The first portion 102A of the housing 102 includes a plurality of exhaust ports 110 spaced at one-hundred twenty degree intervals. As is shown, an upper flange 106A includes an associated bearing 108A, which allows the shaft 104 to turn with respect thereto. The upper flange 106A is attached to the first portion 102A, via fasteners 123 that extend through apertures formed in the flange 106A. A plurality of grooves 132A and 132B are formed in a lower surface of the first portion 102A and in an upper surface of the second portion 102B to receive injection port sleeves 130, which are spaced at one-hundred twenty degree intervals.

Figure 1A:
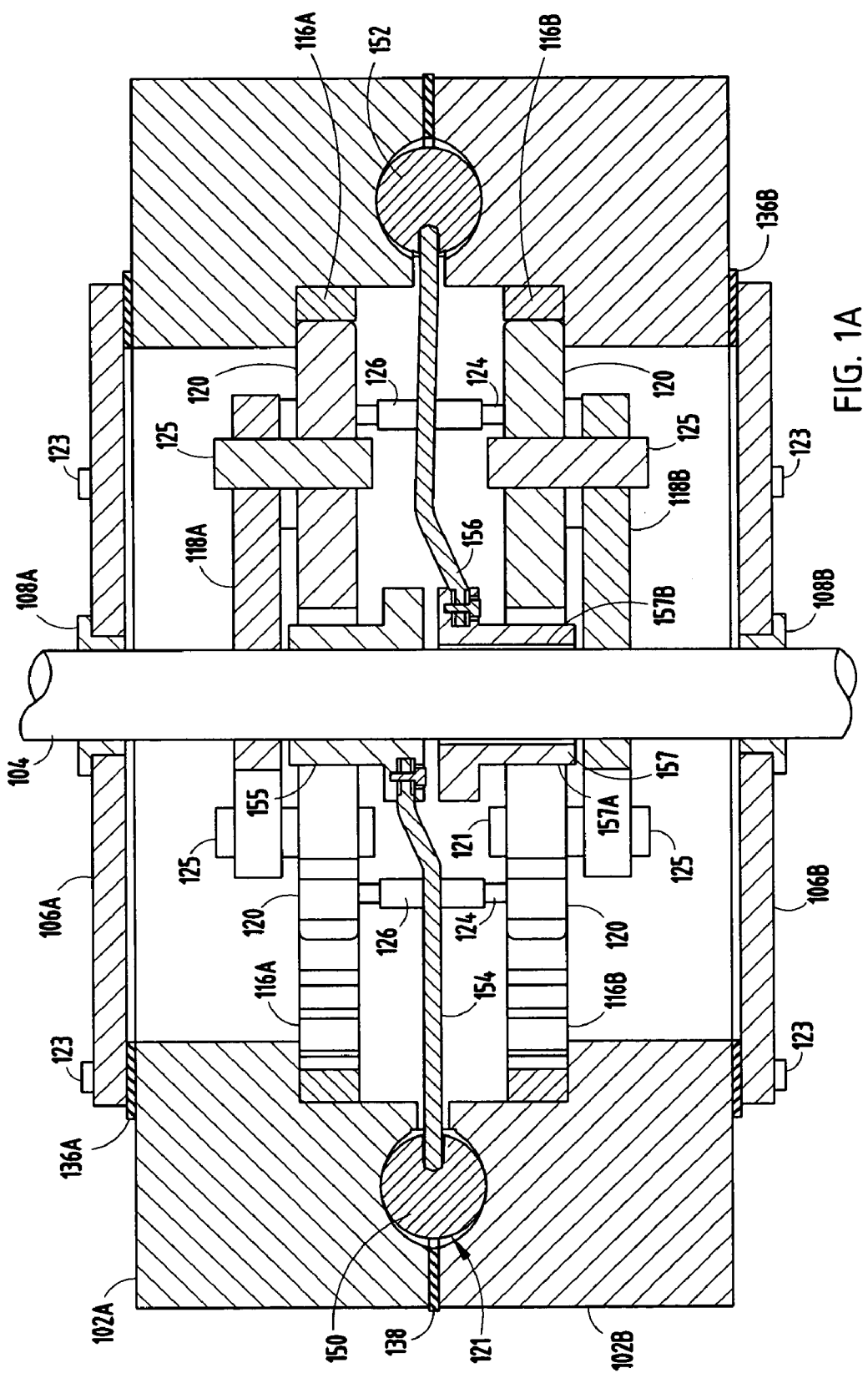
FIG. 1A is a cross-sectional view of the engine of FIG. 1, cross-sectioned along the line IA—IA.

As is better shown in FIG. 1A, a gasket 136A is positioned between the flange 106A and the first portion 102A of the housing 102 and a gasket 136B is positioned between the lower flange 106B and the lower portion 102B of the housing 102. A plurality of main pistons 150 are fixedly attached to a collar 155, via main piston rods 154. The collar 155 is affixed, e.g., with a set screw (not shown), to the main shaft 104. A plurality of following pistons 152 are coupled to a collar 157, via following piston rods 156. The collar 157 includes an outer portion 157A and an inner bearing portion 157B that movably couples the collar 157, with respect to the shaft 104. That is, the collar 157 is not fixed to the shaft 104. As is further described below, a timing bar 124 extends between gears 120 mounted (e.g., with fasteners 125) to an upper timing mount 118A and a lower timing mount 118B, respectively. A gear 120 mounted to the lower timing mount 118B engages a lower ring gear 116B and the gear 120 movably mounted to the upper timing mount 118A engages an upper ring gear 116A. The ring gear 116A is fixed, e.g., pinned, inside the first portion 102A of the housing 102 and the ring gear 116B is fixed inside the second portion 102B of the housing 102. As is further discussed below, the timing bar 124 acts upon the rod 156 to force the following piston 152 towards its associated main piston 150 to create compression in the chamber between associated piston sets every one-hundred twenty degrees.

Figure 2A:
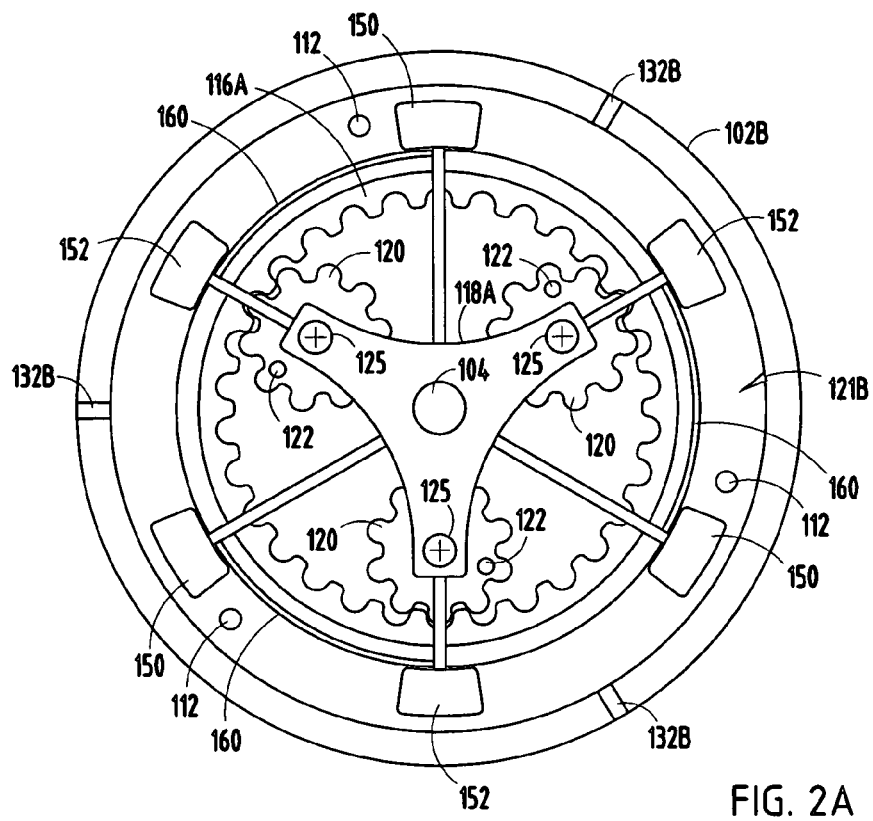
FIG. 2A is a top view of the rotary engine of FIG. 1, with the upper housing portion removed.
Figure 2B:
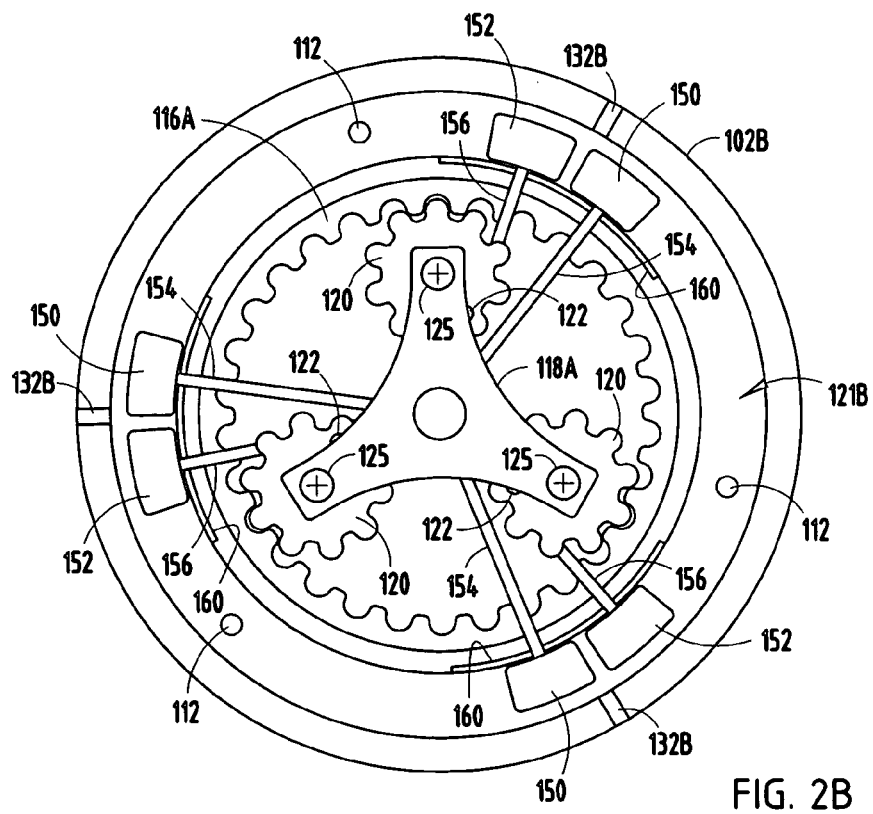
FIG. 2B is a top view of the rotary engine of FIG. 1, with the upper housing portion removed and the piston pairs in compression.

With reference to FIG. 2A, a portion of the rotary engine 100 is depicted with the first portion 102A of the housing 102 removed. In FIG. 2A, the main pistons 150 and the following pistons 152 are not in compression. With reference to FIG. 2B, the following pistons 152 are forced in compression against the main pistons 150.

Figure 3A:
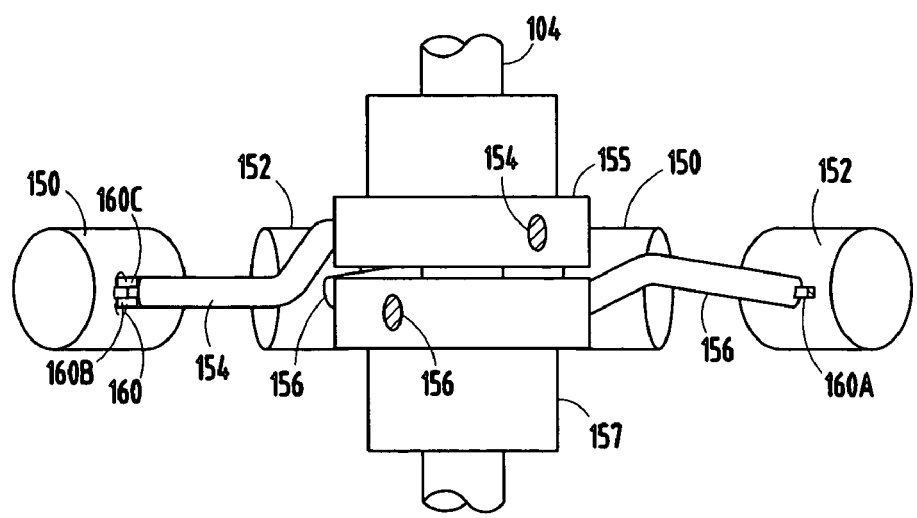
FIG. 3A is a side view of two piston pairs further detailing the seal formed by the piston key and the piston fingers.
Figure 3B:
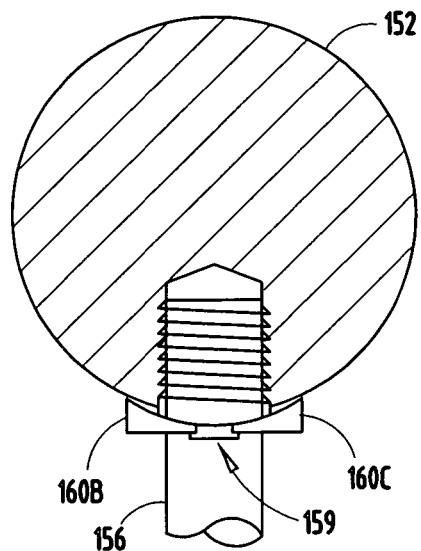
FIG. 3B is a partial cross-sectional view of a following piston and its associated piston rod, showing the piston fingers extending from the following piston.

With reference to FIG. 3A, the relationship between a piston pair, i.e., a main piston 150 and a following piston 152, are further depicted. The main piston 150 has extending therefrom, at an inside surface, a piston key 160A and the following piston 152 has extending therefrom a pair of piston fingers 160B and 160C. The piston fingers 160B and 160C, in combination with the piston key 160A, form a seal at an interior of a toroidal passageway 121 and effectively seal the toroidal passageway 121 at its interior between the pistons to allow a combustion chamber to be created. As is better shown in FIG. 3B, following piston 152 threadingly receives the rod 156 and has the piston fingers 160B and 160C extending from an interior surface. The rod 156 also includes a centrally located aperture 159 for receiving the piston key 160A. Alternatively, the piston rods may be pinned, or otherwise fixed, to the pistons.

Figure 3C:
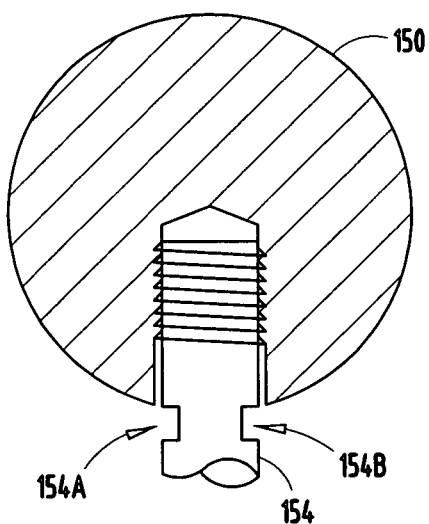
FIG. 3C is a partial cross-sectional view of a main piston and a main piston rod.
Figure 3D:
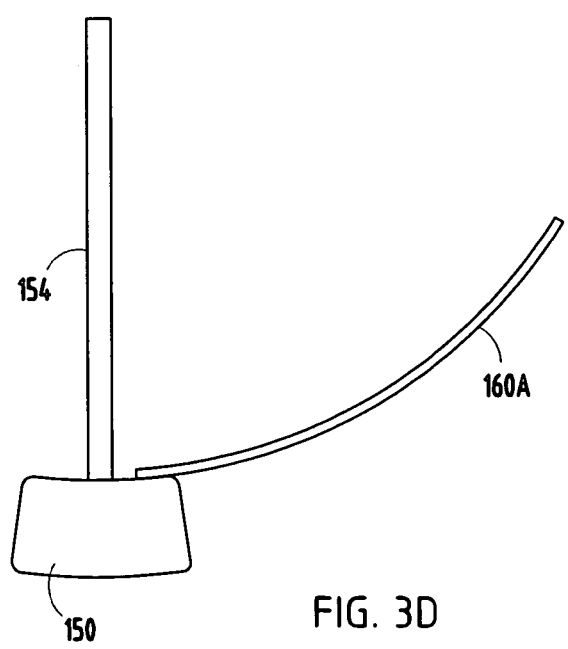
FIG. 3D is a top down view of a main piston and its associated arc piston key extending therefrom.

With reference to FIG. 3C, a partial cross-section of the piston 150 and its associated rod 154 is shown. As is depicted, the rod 154 includes notches 154A and 154B for receiving the piston fingers 160B and 160C. Alternatively, as is mentioned above, the piston fingers 160B and 160C may extend from the main piston 150 and the piston key 160A may extend from the following piston 152. In this case, the rod 156 would include the notches 154A and 154B and the rod 154 would include the aperture 159. With reference to FIG. 3D, the arced nature of the piston key 160A is further illustrated. It should be appreciated that the arc of the piston key 160A and the piston fingers 160B and 160C are configured to match the arc of the toroidal passageway 121, which is created when the first portion 102A and the second portion 102B of the housing 102 are joined to form the housing 102.

Figure 4:
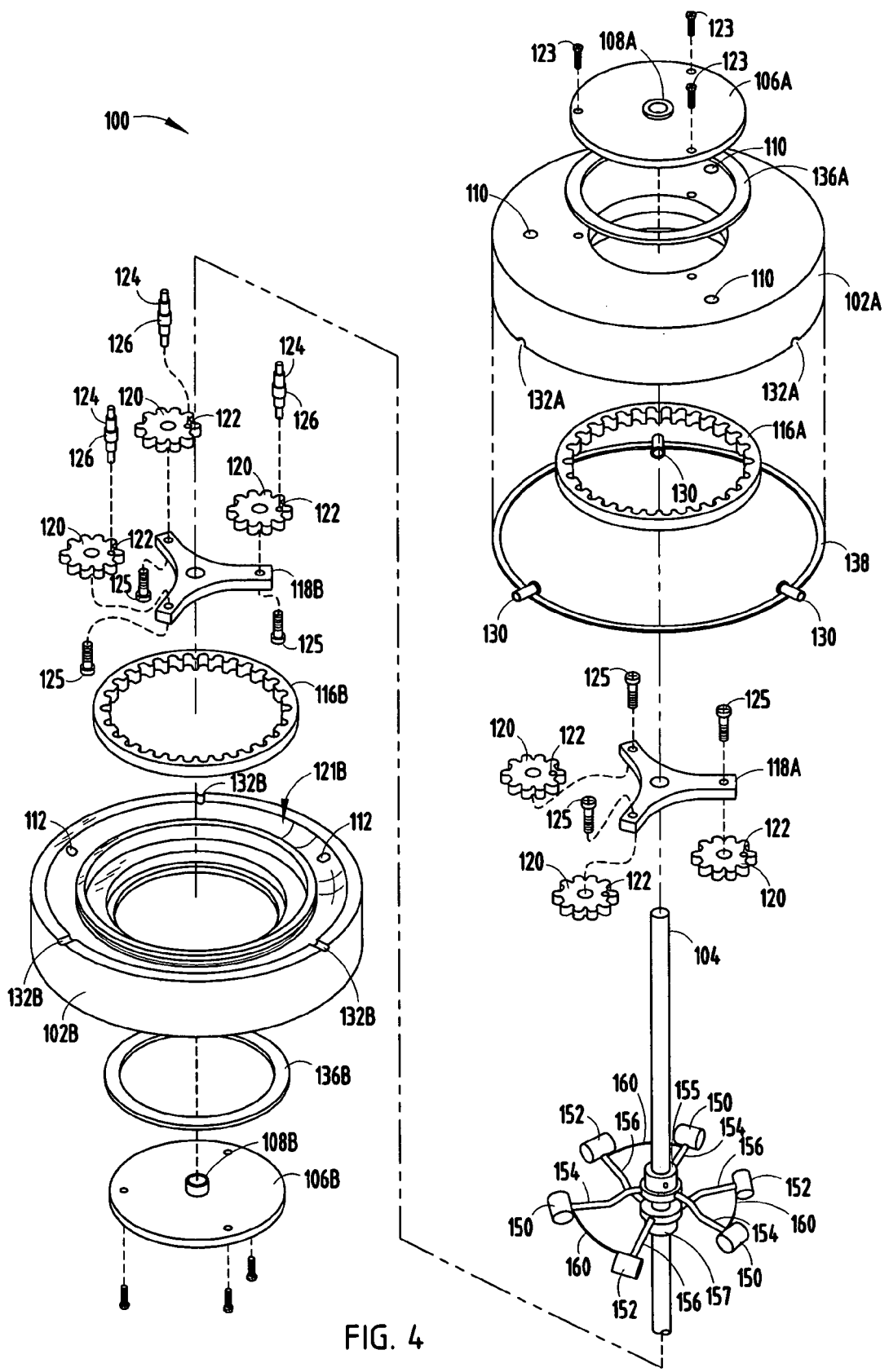
FIG. 4 is an exploded view of the rotary engine of FIG. 1.

With reference to FIG. 4, an exploded view of the rotary engine 100 further illustrates the positioning of the various components of the engine 100. While simple screws 125 are depicted attaching the gears 120 to the timing mounts 118A and 118B, it should be appreciated that bushings and/or bearings may be utilized to increase the life of the assembly and to reduce wear of the assembly. It should also be appreciated that a pin may extend between the associated gears 120 to attach the gears to both the timing mounts 118A and 118B in the event that a motor is designed such that the rods 156 of the following pistons 152 would not hit the pin so designed.

Accordingly, a rotary engine has been described herein, which utilizes a reduced number of parts to provide an economical rotary engine, that is relatively easy to maintain and that may be useful for a wide variety of applications.

The above description is considered that of the preferred embodiment(s) only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A rotary engine, comprising:
a housing including a first portion and a second portion, wherein the first portion includes an upper ring gear and the second portion includes a lower ring gear, and wherein the first and second portions provide a toroidal passageway having an interior opening when joined;
a shaft centrally positioned through a center of the upper and lower ring gears;
a plurality of main pistons positioned within the toroidal passageway, wherein each of the main pistons includes an elongated main piston key that extends from an inner face of the main piston;
a plurality of main piston rods each including an upper and lower notch, wherein each of the main pistons are coupled to the shaft by one of the main piston rods;
a plurality of following pistons positioned within the toroidal passageway and fixed with respect to each other, wherein each of the following pistons is fixed with respect to the other following pistons and each of the following pistons includes an upper and lower piston finger that extend from an inner face of the following piston and which are received in the upper and lower notches, respectively, of an associated one of the main pistons, and wherein one of the following pistons is positioned between each of the main pistons and works in conjunction with one of the main pistons;
a plurality of following piston rods each including a keyway that receives the main piston key of an associated one of the main pistons, wherein each of the following pistons are movably mounted to the shaft by one of the following piston rods, and wherein the main piston key and the following piston fingers provide a seal and in conjunction with a portion of the first and second portions of the housing provide a combustion chamber for each associated piston pair;
a following piston timing mechanism including an upper timing mount and a lower timing mount spaced apart and each coupled to the shaft, wherein each of the upper and lower timing mounts includes a plurality of spaced arms each of which has an associated timing gear movably coupled adjacent an end of each of the arms, wherein the gears associated with the upper timing mount are in engagement with the upper ring gear and the gears associated with the lower timing mount are in engagement with the lower ring gear; and
a plurality of timing bars, wherein one of the timing bars is fixed between and offset from a center of each of the timing gears coupled to the upper and lower timing mounts, and wherein the timing bars engage the following piston rods to initiate compression in the combustion chambers.

2. The rotary engine of claim 1, wherein the housing includes a plurality of intake ports, a plurality of exhaust ports and a plurality of ignition ports.

3. The rotary engine of claim 2, wherein the housing includes three intake ports, three exhaust ports and three ignition ports, and wherein the intake ports are positioned at eighty, two-hundred and three-hundred twenty degrees, the exhaust ports are positioned at seventy, one-hundred ninety and three-hundred ten degrees and the ignition ports are positioned at zero, one-hundred twenty and two-hundred forty degrees.

4. The rotary engine of claim 1, wherein a tooth ratio of the upper and lower ring gears and the timing gears is three to one.

5. The rotary engine of claim 4, wherein the upper and lower ring gears have thirty teeth and the timing gears have ten teeth.

6. The rotary engine of claim 1, further comprising:
a plurality of gear axles positioned between each of the gears of the upper and lower timing mounts, the gear axes attaching the gears to the upper and lower timing mounts.

7. The rotary engine of claim 1, wherein the first and second portions of the housing each include an integrated piston finger shelf for engaging the piston fingers of the following pistons.

8. The rotary engine of claim 1, wherein the housing, the main pistons and the following pistons are made of a ceramic material.

9. A rotary engine, comprising:
a housing including a first portion and a second portion, wherein the first portion includes an upper ring gear and the second portion includes a lower ring gear, and wherein the first and second portions provide a toroidal passageway having an interior opening when joined;
a shaft centrally positioned through a center of the upper and lower ring gears;
a plurality of main pistons positioned within the toroidal passageway, wherein each of the main pistons includes an elongated main piston seal that extends from an inner face of the main piston;
a plurality of main piston rods, wherein each of the main pistons are coupled to the shaft by one of the main piston rods;
a plurality of following pistons positioned within the toroidal passageway, wherein each of the following pistons is fixed with respect to the other following pistons and each of the following pistons includes a following piston seal that extends from an inner face of the following piston to the inner face of an associated one of the main pistons, and wherein one of the following pistons is positioned between each of the main pistons and works in conjunction with one of the main pistons;

a plurality of following piston rods fixed with respect to each other and movably mounted to the shaft, wherein each of the following pistons is coupled at one end to one of the following pistons, and wherein the main piston seal and the following piston seal in conjunction with a portion of the first and second portions of the housing provide a combustion chamber for each associated piston pair;

a following piston timing mechanism including an upper timing mount and a lower timing mount spaced apart and each coupled to the shaft, wherein each of the upper and lower timing mounts includes a plurality of spaced arms each of which has an associated timing gear movably coupled adjacent an end of each of the arms, wherein the gears associated with the upper timing mount are in engagement with the upper ring gear and the gears associated with the lower timing mount are in engagement with the lower ring gear; and a plurality of timing bars, wherein one of the timing bars is fixed between and offset from a center of each of the timing gears coupled to the upper and lower timing mounts, and wherein the timing bars engage the following piston rods to initiate compression in the combustion chambers, and wherein the housing includes a plurality of intake ports, a plurality of exhaust ports and a plurality of ignition ports.

10. The rotary engine of claim 9, wherein the housing includes three intake ports, three exhaust ports and three ignition ports, and wherein the intake ports are positioned at eighty, two-hundred and three-hundred twenty degrees, the exhaust ports are positioned at seventy, one-hundred ninety and three-hundred ten degrees and the ignition ports are positioned at zero, one-hundred twenty and two-hundred forty degrees.

11. The rotary engine of claim 10, wherein a tooth ratio of the upper and lower ring gears and the timing gears is three to one.

12. The rotary engine of claim 11, wherein the upper and lower ring gears have thirty teeth and the timing gears have ten teeth.

13. The rotary engine of claim 9, further comprising:
a plurality of gear axles positioned between each of the gears of the upper and lower timing mounts, the gear axes attaching the gears to the upper and lower timing mounts.

14. The rotary engine of claim 9, wherein the first and second portions of the housing each include an integrated shelf for engaging at least a portion of one of the following and main piston seals.

15. The rotary engine of claim 9, wherein the housing, the main pistons and the following pistons are made of a ceramic material.

16. A rotary engine, comprising:
a ceramic housing including a first portion and a second portion, wherein the first portion includes an upper ring gear and the second portion includes a lower ring gear, and wherein the first and second portions provide a toroidal passageway having an interior opening when joined;
a shaft centrally positioned through a center of the upper and lower ring gears;
a plurality of ceramic main pistons positioned within the toroidal passageway, wherein each of the main pistons includes an elongated main piston seal that extends from an inner face of the main piston;

a plurality of main piston rods, wherein each of the main pistons are coupled to the shaft by one of the main piston rods;

a plurality of ceramic following pistons positioned within the toroidal passageway, wherein each of the following pistons is fixed with respect to the other following pistons and each of the following pistons includes a following piston seal that extends from an inner face of the following piston to the inner face of an associated one of the main pistons, and wherein one of the following pistons is positioned between each of the main pistons and works in conjunction with one of the main pistons;

a plurality of following piston rods fixed with respect to each other and movably mounted to the shaft, wherein each of the following pistons is coupled at one end to one of the following pistons, and wherein the main piston seal and the following piston seal in conjunction with a portion of the first and second portions of the housing provide a combustion chamber for each associated piston pair;

a following piston timing mechanism including an upper timing mount and a lower timing mount spaced apart and each coupled to the shaft, wherein each of the upper and lower timing mounts includes a plurality of spaced arms each of which has an associated timing gear movably coupled adjacent an end of each of the arms, wherein the gears associated with the upper timing mount are in engagement with the upper ring gear and the gears associated with the lower timing mount are in engagement with the lower ring gear; and a plurality of timing bars, wherein one of the timing bars is fixed between and offset from a center of each of the timing gears coupled to the upper and lower timing mounts, and wherein the timing bars engage the following piston rods to initiate compression in the combustion chambers, and wherein the housing includes a plurality of intake ports, a plurality of exhaust ports and a plurality of ignition ports.

17. The rotary engine of claim 16, wherein the housing includes three intake ports, three exhaust ports and three ignition ports, and wherein the intake ports are positioned at eighty, two-hundred and three-hundred twenty degrees, the exhaust ports are positioned at seventy, one-hundred ninety and three-hundred ten degrees and the ignition ports are positioned at zero, one-hundred twenty and two-hundred forty degrees.

18. The rotary engine of claim 17, wherein a tooth ratio of the upper and lower ring gears and the timing gears is three to one.

19. The rotary engine of claim 18, wherein the upper and lower ring gears have thirty teeth and the timing gears have ten teeth.

20. The rotary engine of claim 16, further comprising:
a plurality of gear axles positioned between each of the gears of the upper and lower timing mounts, the gear axes attaching the gears to the upper and lower timing mounts.

21. The rotary engine of claim 16, wherein the first and second portions of the housing each include an integrated shelf for engaging at least a portion of one of the following and main piston seals.

* * * * *